United States Patent [19] [11] 4,116,068
Megahed [45] Sep. 26, 1978

[54] ADAPTER FOR THE ASPIRATION NOZZLE OF AN AUTOMATIC ANALYTICAL INSTRUMENT

[75] Inventor: Shenoda S. Megahed, Rutherford, N.J.

[73] Assignee: Becton, Dickinson and Company, Rutherford, N.J.

[21] Appl. No.: 778,929

[22] Filed: Mar. 18, 1977

[51] Int. Cl.[2] ........................ G01N 1/14; B01L 3/02
[52] U.S. Cl. ........................ 73/425.4 P; 73/425.6
[58] Field of Search .................... 73/425.4 P, 425.4 R, 73/425.6; 128/214 R, DIG. 5

[56] References Cited

U.S. PATENT DOCUMENTS

| | | | |
|---|---|---|---|
| 2,959,964 | 11/1960 | Streitfelt | 73/425.6 |
| 3,064,648 | 11/1962 | Bujan | 128/214 R |
| 3,186,236 | 6/1965 | Cox | 73/425.6 |
| 3,406,573 | 10/1968 | Burke | 73/425.6 |
| 4,020,831 | 5/1977 | Adler | 128/DIG. 5 |

*Primary Examiner*—Daniel M. Yasich
*Attorney, Agent, or Firm*—Kane, Dalsimer, Kane, Sullivan and Kurucz

[57] ABSTRACT

The disclosure is of an adapter for transferring liquid specimens from a collection vessel to an analysis instrument, through connection with the aspiration nozzle of the instrument.

2 Claims, 5 Drawing Figures

ADAPTER FOR THE ASPIRATION NOZZLE OF AN AUTOMATIC ANALYTICAL INSTRUMENT

BACKGROUND OF THE INVENTION

1. Field of the invention

The invention relates to tubular adapters for the transfer of liquid materials between vessels.

2. Brief Description of the Prior Art

Vessels for the collection of liquid specimens for biochemical analysis are known in a wide variety of shapes and sizes. A widely used collection vessel is of the type described in U.S. Pat. No. 2,965,255. This type of collection vessel is characterized in part by a narrow diameter, relatively deep body and a narrow, cannula penetrable, closed neck.

Automatic analysis instruments are similarly well known. For example the Coulter S Sr. Auto Counter is an analytical instrument for hematology tests to be performed on blood specimens (Coulter Company). The instrument includes an aspiration nozzle which, when immersed in the liquid specimen aspirates a sample into the instrument for analysis.

The difficulty of the prior art resides in the incompatibility of the specimen collection vessels with the aspiration nozzles. They do not mate and the collected specimen generally must be transferred to a special vessel having a special opening designed to receive the aspiration nozzle. The present invention provides an adapter which permits one to aspirate a sample of the liquid specimen directly from a collection vessel of the type described in U.S. Pat. No. 2,965,255 into an automatic analytical instrument.

SUMMARY OF THE INVENTION

The invention comprises an adapter for transferring liquid specimens from a collection vessel to an analysis instrument, which comprises; an elongate tube having a first end and a second end, said second end being expanded so that the bore of said tube has the configuration of a funnel with the funnel opening at said second end, the bore of said tube at said first end having a diameter of about 0.050 inches and the outer diameter of said tube at said first end being about 0.085 inches; an endpiece having a first surface, a second surface and a straight conduit therethrough communicating between said first and second surfaces, said conduit at a point proximal to said second surface being expanded so that it will receive in sealing association and mate with the expanded second end of said elongate tube; a flexible tube mounted over the first surface and on said endpiece, the end of said flexible tube distal to said endpiece being open and of a dimension adapted to receive the aspiration nozzle of a biochemical analysis instrument; said expended end of said elongate tube being mounted in the expanded portion of the conduit passing through said endpiece, sealing the second surface; the bore of said elongate tube, conduit of said endpiece and bore of said flexible tube all being in communication with each other to form a continuous, closed, uninterrupted passage between the first end of said elongate tube and the distal end of said flexible tube, said passing being free of cavities which would retain and trap liquids passing therethrough; and means for grasping said adapter, mounted on said endpiece.

DETAILED DESCRIPTION OF THE PREFERRED EMBODIMENTS OF THE INVENTION

Figure 1:
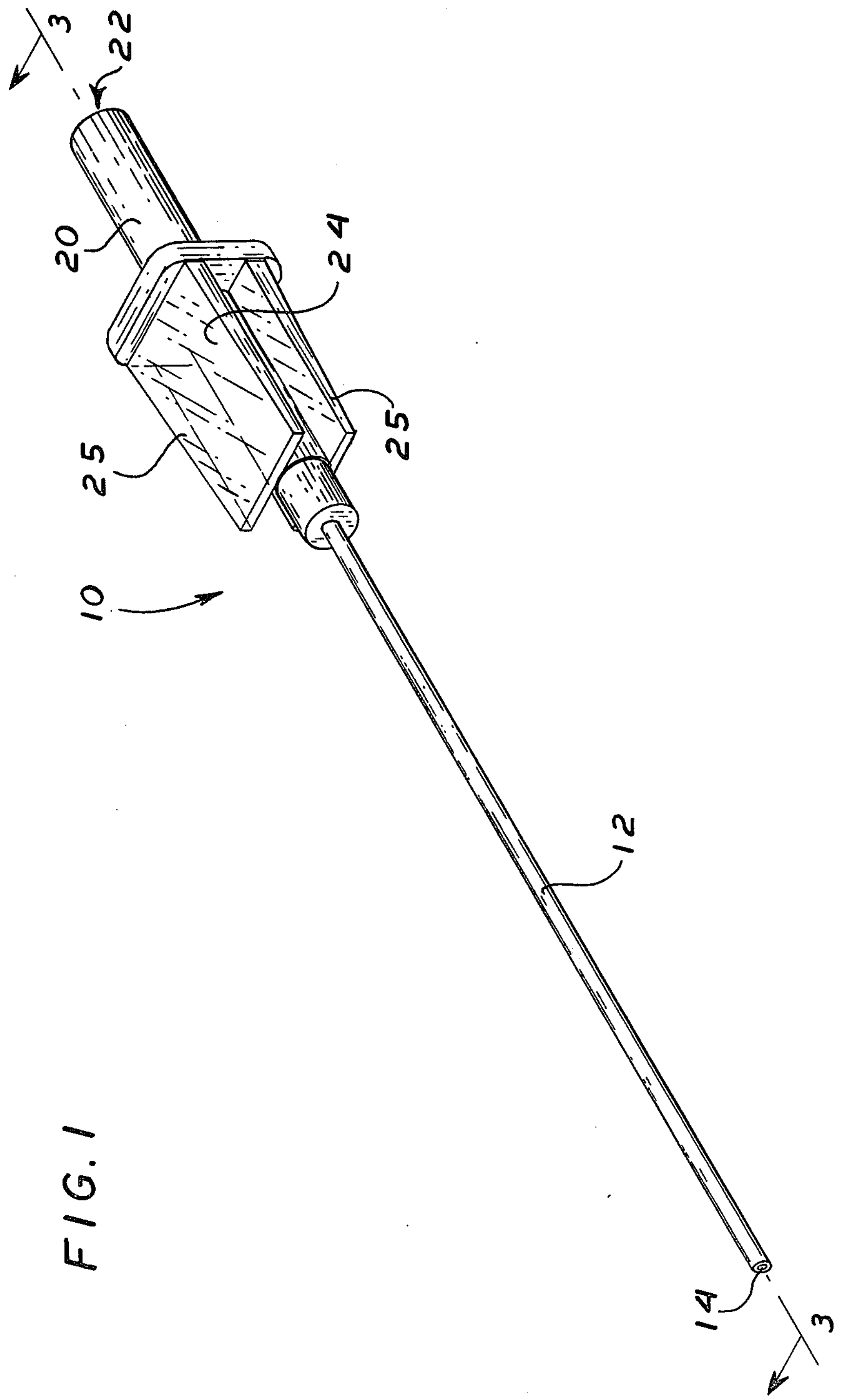
FIG. 1 is an isometric view of an embodiment adapter of the invention.

FIG. 1 is an isometric view of an embodiment adapter 10 of the invention. The adapter 10 comprises an elongate tube 12 having a first open end 14 and a second open end 16 endpiece 24 and tube 20 (not seen in FIG. 1). The tube 12 may be fabricated from any flexible material having lengthwise rigidity. Preferably the tube 12 is fabricated from a polymeric resin such as polypropylene and the like. Endpiece 24 is a hollow tubular member mounted on the end 16 of tube 12. The endpiece 24 has an open end 18 (not seen in FIG. 1) upon which is mounted a flexible tube 20 having an open end 22. The endpiece 24 may be fabricated from any moldable polymeric resin, preferably a rigid polyethylene. The flexible tube 20 may be fabricated from any polymeric resin conventionally used to make tubing, such as a polyvinyl resin. The adapter 10 has finger grasping surfaces 25, which are integrally molded planar surfaces on endpiece 24.

Figure 2:
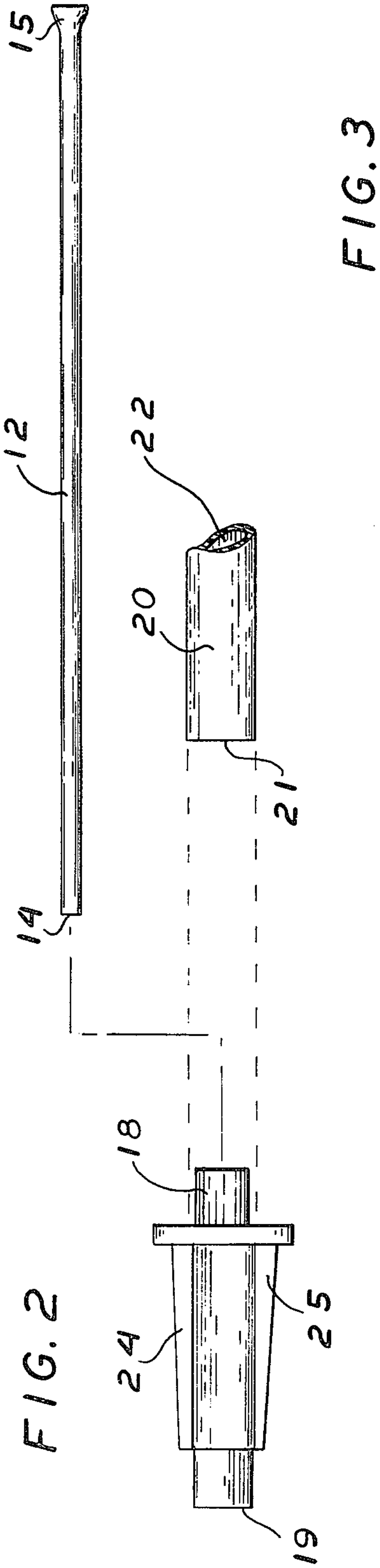
FIG. 2 is a view of the disassembled components of the adapter of FIG. 1.

Further structural details of adapter 10 may be seen by referring now to FIG. 2, showing the component parts of adapter 10 in disassembly. Thus elongate tube 12 can be seen to have a first end 14 and an expanded second end 15. Endpiece 24 has a first end or surface 18 and a second surface 19 which is normally closed or sealed by receipt of the end 15 of tube 12. A bore or conduit (not seen in FIG. 2) traverses the body of endpiece 24 providing communication between surfaces 18, 19. The tube 12 is mounted in end 19 by inserting it, end 14 first, into the bore of endpiece 24 until expanded end 15 is received to close and seal end 19 of endpiece 24. The surface 18 of endpiece 24 receives flexible tube 20, end 21 of which mounts on surface 18 so open end 22 is free for engagement with the aspiration nozzle of an analytical instrument.

Figure 3:
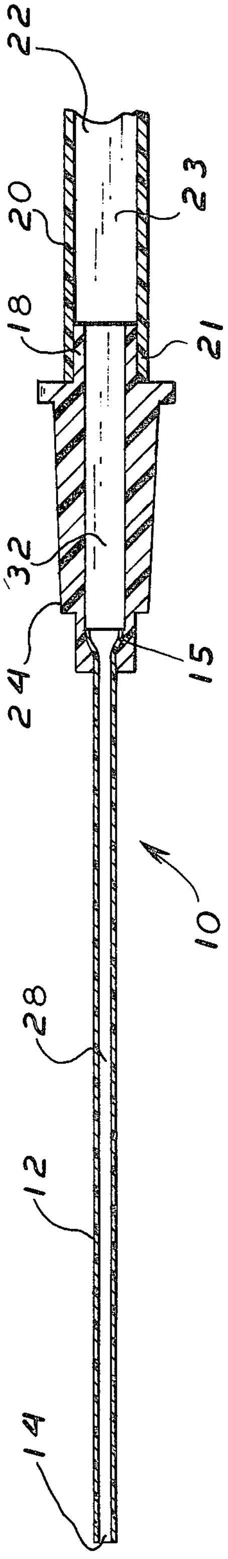
FIG. 3 is a cross-sectional side elevation along lines 3-3 of FIG. 1.

FIG. 3 is a cross-sectional view along lines 3—3 of FIG. 1 and shows that bore 28 of elongate tube 12 together with conduit 32 of endpiece 24 and bore 23 of flexible tube 20 form an axially aligned, continuous, uninterrupted passage between open end 14 and open end 22. It will also be seen that at the junctures between bores 28, 23 and conduit 32 there are no cavities or discontinuities which would entrap or retain fluids passing through the internal passageway. This assures that in use, aspirated fluid is completely aspirated into the analytical instrument.

Figure 4:
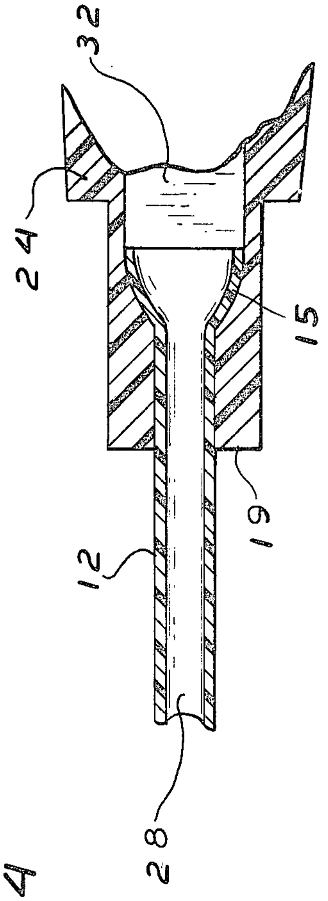
FIG. 4 is an enlarged view of a portion of the adapter seen in FIG. 3.

Referring now to FIG. 4, one may observe the enlarged detail showing the joint between elongate tube 12 and endpiece 24. The expanded end 15 gives to tube 12 the configuration of a funnel, in communication with conduit 32. The end 19 of conduit 32 is molded in the same funnel shape so as to receive end 15 and mate therewith so as to form a seal between end 15 of tube 12 and end 19 of endpiece 24. The funnel formed by end 15 assures that fluids aspirated therethrough are not retained by any structure, but will pass back if not completely aspirated through the adapter 10.

Figure 5:
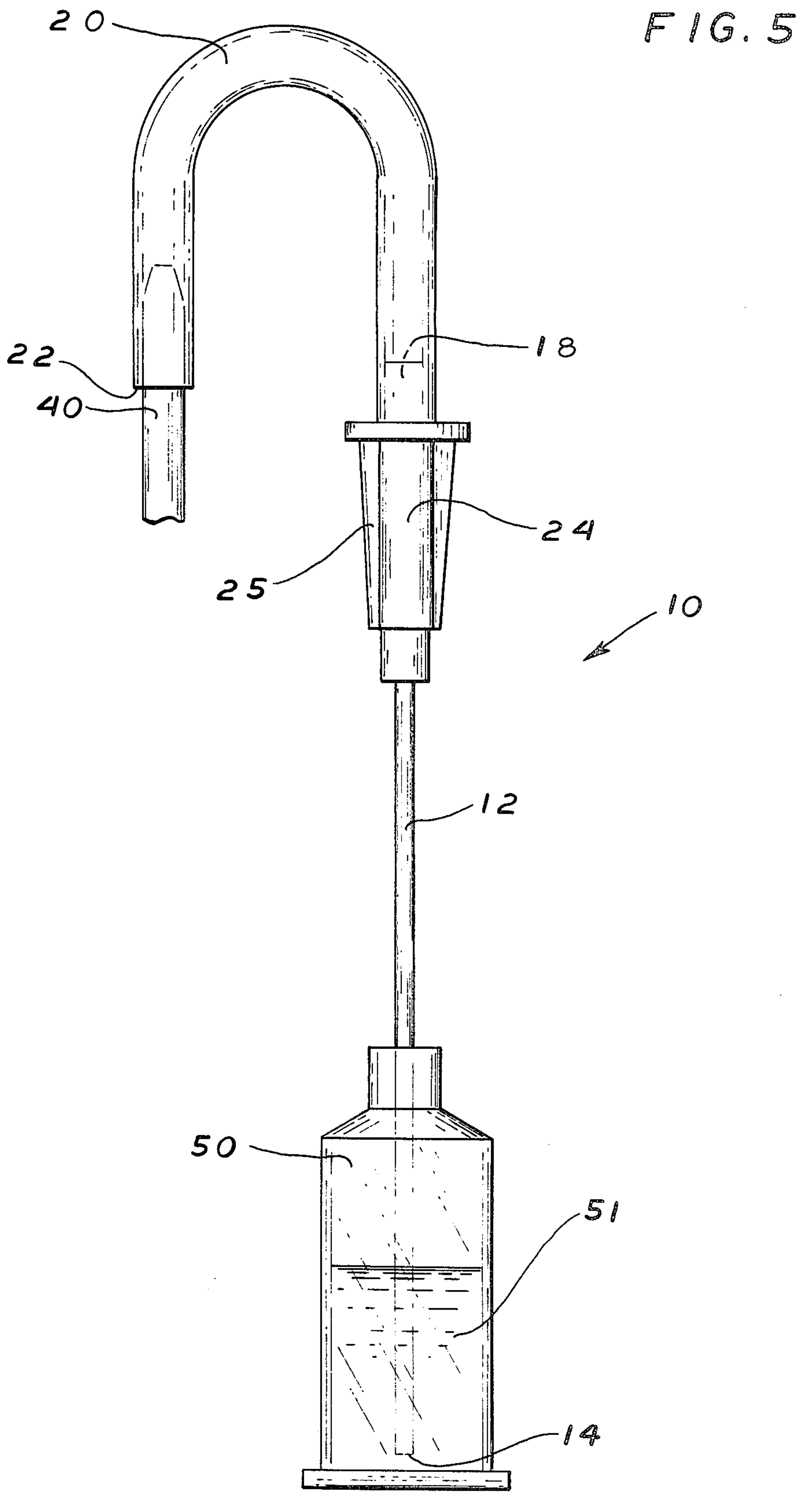
FIG. 5 is an isometric view of the embodiment adapter seen in FIG. 1, being used to aspirate a liquid from a collection vessel into an analyses aspirating nozzle.

FIG. 5 is an isometric view showing the adapter 10 in use. Thus end 14 has been inserted into a collection vessel 50 containing a liquid specimen 51 for analysis. The vessel 50 is of the type shown in U.S. Pat. No. 2,965,255, having a restricted access through a narrow neck. The adapter 10 may gain access readily if it has certain specifications, i.e.; the end 14 of elongate tube 12 should have an outer diameter of about 0.085 inches and the bore 28 should have a diameter of about 0.050 inches for efficient aspiration. The end 22 of flexible tube 20 receives the aspirating nozzle 40 of an analytical instrument (not seen in FIG. 5). As vacuum is applied from the analytical instrument, the desired aliquot of liquid specimen 51 is withdrawn from vessel 50 and is transferred by adapter 10 to the aspirating nozzle 40.

I claim:

1. An adapter for transferring liquid specimens from a collection vessel to an analysis instrument, which comprises;

an elongate tube having a first end and a second end, said second end being expanded so that the bore of said tube has the configuration of a funnel with the funnel opening at said second end, the bore of said tube at said first end having a diameter of about 0.050 inches and the outer diameter of said tube at said first end being about 0.085 inches;

an endpiece having a first end surface, a second end surface and a straight conduit therethrough communicating between said first and second end surfaces, said conduit at a point proximal to said second end surface being expanded so that it will receive in sealing association and mate with the expanded second end of said elongate tube;

a flexible tube mounted over the first end surface and on said endpiece, the end of said flexible tube distal to said endpiece being open and of a dimension adapted to receive the aspiration nozzle of a biochemical analysis instrument;

said expanded end of said elongate tube being mounted in the expanded portion of the conduit passing through said endpiece, sealing the second end surface;

the bore of said elongate tube, conduit of said endpiece and bore of said flexible tube all being in communication with each other to form a continuous, closed, uninterrputed passage between the first end of said elongate tube and the distal end of said flexible tube, said passage being free of cavities which would retain and trap liquids passing therethrough; and means for grasping said adapter, mounted on said endpiece.

2. The adapter of claim 1 wherein said means for grasping comprises integrally molded planar surfaces on said endpiece.

* * * * *